(12) United States Patent
Turgeon et al.

(10) Patent No.: US 9,140,181 B2
(45) Date of Patent: Sep. 22, 2015

(54) POWER-PRODUCING APPARATUS AND METHOD

(71) Applicants: Luke J. Turgeon, Shillington, PA (US); Eric E. Turgeon, Shillington, PA (US)

(72) Inventors: Luke J. Turgeon, Shillington, PA (US); Eric E. Turgeon, Shillington, PA (US)

(*) Notice: Subject to any disclaimer, the term of this patent is extended or adjusted under 35 U.S.C. 154(b) by 0 days.

(21) Appl. No.: 14/194,223

(22) Filed: Feb. 28, 2014

(65) Prior Publication Data

US 2014/0261249 A1 Sep. 18, 2014

Related U.S. Application Data

(60) Provisional application No. 61/793,224, filed on Mar. 15, 2013.

(51) Int. Cl.
*F02B 65/00* (2006.01)
*F02B 67/08* (2006.01)

(52) U.S. Cl.
CPC ............... *F02B 65/00* (2013.01); *F02B 67/08* (2013.01); *Y02T 10/7083* (2013.01)

(58) Field of Classification Search
CPC ...... F02B 65/00; F02B 67/08; Y02T 10/7083
USPC .............................. 123/2, 3; 60/612, 614, 619
See application file for complete search history.

(56) References Cited

U.S. PATENT DOCUMENTS

| | | | |
|---|---|---|---|
| 2,583,651 A | 1/1952 | Hornung | |
| 3,680,305 A | 8/1972 | Miller | |
| 3,939,806 A * | 2/1976 | Bradley | 123/3 |
| 4,059,958 A * | 11/1977 | Heklowski et al. | 60/614 |
| 7,168,250 B2 | 1/2007 | Wei | |
| 2003/0213244 A1* | 11/2003 | Faletti | 60/612 |
| 2004/0055298 A1* | 3/2004 | Fischer et al. | 60/606 |
| 2010/0095680 A1* | 4/2010 | Rudrapatna et al. | 60/754 |
| 2010/0288212 A1 | 11/2010 | Williams | |
| 2012/0096869 A1 | 4/2012 | Kessell | |

* cited by examiner

*Primary Examiner* — Lindsay Low
*Assistant Examiner* — Kevin Lathers
(74) *Attorney, Agent, or Firm* — Robert J. Yarbrough of Lipton, Weinberger & Husick

(57) ABSTRACT

A primary reciprocating engine is combined with a secondary turbine engine. The turbine engine utilizes the exhaust of the reciprocating engine as fuel, resulting in an increase in efficiency and reduction in emissions over a conventional reciprocating engine alone. The secondary turbine engine powers secondary functions of the reciprocating engine, such as relieving the back pressure at the exhaust ports, driving the turbocharger that pressurizes the air intake, and driving an electrical generator. Oxyhydrogen (HHO) used to ignite the reciprocating engine exhaust and complete combustion of the reciprocating engine fuel is obtained by disassociating distilled water into hydrogen and oxygen using the electricity from the electrical generator.

28 Claims, 11 Drawing Sheets

POWER-PRODUCING APPARATUS AND METHOD

I. RELATED APPLICATIONS

This application is entitled to priority from U.S. provisional patent application No. 61/793,224, 'Power-Producing Apparatus and Method,' filed Mar. 15, 2013 by Luke J. Turgeon et al.

The following documents are incorporated by reference as if set forth in full herein:

a. U.S. provisional patent application No. 61/793,224, 'Power-Producing Apparatus and Method,' filed Mar. 15, 2013 by Luke J. Turgeon et al. and the documents incorporated by reference in that application.

b. U.S. non-provisional application Ser. No. 13/350,221, 'Electrolytic hydrogen generator and method,' filed Jan. 13, 2012 by Luke J. Turgeon et al., and the documents incorporated by reference in that application c. U.S. non-provisional application Ser. No. 13/541,921, 'Igniter for Internal Combustion Engine and Method,' filed Jul. 5, 2012 by Luke J. Turgeon and the documents incorporated by reference in that application.

II. BACKGROUND OF THE INVENTION

A. Field of the Invention

The invention is an apparatus and method to convert chemical energy in an exhaust or waste gas stream into electrical or mechanical power through the use of a turbine engine fueled by combustible gas and particulate matter in an exhaust or waste gas stream. In one application, the invention is an improved reciprocating internal combustion engine in which efficiency is improved and tailpipe emissions are reduced by use of a turbine engine fueled by the exhaust of the reciprocating engine. The invention is also a method of operating a reciprocating engine using a turbine engine fueled by the exhaust of the reciprocating engine. The invention is also a kit and method for adding the technology of the invention to a reciprocating engine. The apparatus and method of the invention have application beyond reciprocating engines and can apply to any apparatus that produces an exhaust or waste gas stream that contains chemical energy that can be released through combustion, such as chemical energy remaining in the exhaust from the combustion of fossil fuel in an electrical power generating station or chemical energy remaining in the exhaust of a refinery process or of a chemical production facility.

B. Statement of the Related Art

As used in this document, the term 'reciprocating internal combustion engine,' also referred to by the term 'reciprocating engine,' means any internal combustion engine and includes both spark-ignition engines, such as Otto cycle gasoline engines, and compression-ignition engines, such as diesel engines. Reciprocating engines are examples of heat engines, which are defined to be any engine that produces mechanical power by heating a working fluid by combustion of a fuel. The phrase "working fluid" means the gas being pressurized by heat. For both spark-ignition and compression-ignition engines the working fluid is air.

Conventional reciprocating internal combustion engines accept an air-fuel mixture into a cylinder and compress the mixture by reducing the volume within a cylinder with a piston. The piston is driven by a crankshaft propelled by a fly wheel that has enough kinetic energy to achieve the compression. Reciprocating engines typically require a separate source of power, such as electric motor, to start the process.

Compression of the air-fuel mixture is followed by an ignition process. For a spark ignition engine, ignition is initiated by an electrical spark from a spark plug. For a diesel engine, ignition is initiated through compression.

For either a spark ignition engine or a diesel engine, the combusting fuel heats the compressed gases in the cylinder, which increases the pressure within the cylinder approximately in accordance with the ideal gas law $PV=nRT_0 (V_0/V)^m$, where $m=k-1=0.4$. The elevated pressure pushes on the piston and transfers energy to the flywheel. The energy from the flywheel used during the compression step is returned to the flywheel, since gas compression is a reversible process and the compressed air acts as a spring. The additional pressure from the elevated temperature adds more energy to the flywheel, in essence converting chemical energy into heat and then into mechanical motion.

Two limitations of reciprocating internal-combustion engines are efficiency and unwanted emissions of air contaminants. The primary limit of efficiency is a direct outcome of the limitation imposed by entropy. A simple efficiency upper limit is provided through the analysis of the Carnot cycle as follows:

$$\text{Efficiency}=1-T_L/T_H$$

where $T_L$ is the low temperature and $T_H$ is the high temperature of the cycle in degrees absolute. The low temperature can be approximated as the ambient air temperature (about 300 C) and the high temperature is limited by the tolerances of the material from which the engine is constructed (about 900 C). Inserting these temperature values in the Carnot efficiency upper limit formula results in an upper efficiency limit of about 66%.

A primary cause of unwanted emissions for reciprocating engines is due to the short time available for the fuel to combust. If the fuel does not have an adequate time to combust, the unburned fuel is ejected from the engine in the exhaust gas. The time allotted to burn the fuel is typically in conflict with the power produced, since longer combustion time can reduce emissions, but a faster speed of combustion usually translates into more power (power=torque×rpm).

A lot of effort has been focused on the problem of improving power and reducing emissions over the past 50 years. For example, controlling the oxygen/fuel ratio results in a lean or rich mixture. An excess of oxygen produces a 'lean' mixture with more rapid combustion and more power, but also creates an unwanted reaction between oxygen and nitrogen resulting in air contaminant emissions of nitrides, or NOX. Alternatively, not enough oxygen results in a 'rich' mixture and reduces the formation of nitrides but slows combustion, leaving un-combusted fuel in the exhaust gases. Present-day reciprocating internal-combustion engines strive to operate at the stoichiometric value for the oxygen/fuel ratio to maximize power while minimizing emissions of unburned or partially burned fuel by using electronic computer-operated control systems capable of sensing heat, oxygen, fuel flow and other functions of the engine.

A modern reciprocating internal-combustion engine may use turbocharger technology to increase power output. Turbochargers pressurize the air at the reciprocating engine intake using a compressor driven by the back pressure of the engine. The compressed air is then cooled and inserted into the air intake of the engine. A turbocharger can increase the differential pressure from air intake to exhaust by about 10 PSI to 20 PSI resulting in an increase in efficiency. To achieve this increased pressure differential, the pressure at the input reaches about 60 PSI with the exhaust pressure reaching about 40 PSI. Turbochargers are good at increasing efficiency but have little effect on emissions.

A modern reciprocating internal-combustion engine may use a catalytic converter located in the exhaust stream of the engine to complete the combustion process and reduce emissions. Catalytic converters are good at reducing emissions but increase the back pressure at the exhaust port of the reciprocating engine, resulting in a significant decrease in fuel efficiency. Further, catalytic converters can become extremely hot and become fire hazards.

A diesel engine may employ an afterburner for combusting the exhaust gas. By combusting at very high temperature, the afterburners oxidize soot from the partially-burned fuel to $CO_2$. Afterburner systems reduce emissions but result in a loss of efficiency due to an increase in back pressure in the exhaust. Afterburner systems require an additional supply of liquid urea fuel and include the inconvenience of maintaining that fuel supply at all times.

The efficiency of diesel engines can be improved by injecting the fuel using smaller injectors and at increased pressure. This has the effect of misting the diesel fuel into smaller droplets, which reduces the time it takes for the droplets to be combusted.

Alternatively, much effort has gone into inserting oxyhydrogen gas (HHO) into the air intake of reciprocating internal-combustion engines to increase power and reduce emissions. HHO may be obtained through the electrolysis of water using electricity produced by the reciprocating engine. The past efforts to inject HHO have been without much commercial success. The inventor believes that the lack of commercial success of prior HHO systems is due in part to the complexity of burning a second fuel in engines that have been optimized for a single fuel. Engines are tuned to optimize air/fuel mixtures and do not automatically re-optimize themselves when hydrogen is included in the mix. A disadvantage of HHO injection into the air intake of a reciprocating engine is that hydrogen gas causes embrittlement in some metals, causing failure of the metal and creating reliability problems.

As described above, the related art as it applies to this invention is that of a compromise between efficiency and emissions. The prior art does not teach the Invention.

III. BRIEF DESCRIPTION OF THE INVENTION

The hydrogen boost technology ('HBT') of the Invention involves a turbine engine and a reciprocating internal combustion engine in combination. The reciprocating engine, which may be a diesel engine, combusts fuel and produces power and reciprocating engine exhaust. The turbine engine utilizes the reciprocating engine exhaust as fuel and recovers chemical energy from the reciprocating engine exhaust that otherwise would be lost. The Invention includes any apparatus or process that combusts a fuel and produces a product of combustion that contains chemical energy that may be recovered by a turbine engine.

The combination of the turbine engine and the reciprocating engine improves the efficiency of the reciprocating engine by relieving the reciprocating engine of ancillary loads, such as driving an electrical generator or climate control system. The invention reduces tailpipe emissions by incinerating the exhaust gas and particulate matter from the reciprocating engine exhaust at a very high temperature and may replace, or be used in lieu of, a catalytic converter or an afterburner. The use of the turbine engine also improves the performance of the reciprocating engine by reducing the back pressure of the reciprocating engine and increasing the differential pressure between the intake and exhaust ports of the reciprocating engine.

The turbine engine includes a turbine compressor, a combustion chamber and a power turbine. The exhaust of the reciprocating engine is mixed with ambient air and burned in the combustion chamber of the turbine engine. The exhaust and air in the combustion chamber heat and expand, driving the power turbine. The power turbine is configured to spin a power shaft, which drives the turbine compressor. The turbine compressor compresses the reciprocating engine exhaust and fresh air in preparation for combusting the reciprocating engine exhaust in the combustion chamber. The turbine compressor and power turbine each may be axial or centrifugal and may have multiple stages.

Improvements in performance of the reciprocating engine itself are achieved by compressing, or turbo charging, the air entering the reciprocating engine intake port, by depressurizing the exhaust exiting the reciprocating engine exhaust port, or by both pressurizing the intake port and depressurizing the exhaust port. Pressurizing the intake port forces more air to enter the reciprocating engine and allows more fuel to be combusted, producing more power with no increase in engine size. De-pressurizing the exhaust port provides for more complete scavenging of reciprocating engine exhaust from the cylinder, providing more room within the cylinder that can be filled with fresh air and fuel, providing more power with no increase in engine size.

To achieve the goal or pressurizing the intake port and depressurizing the exhaust port, the reciprocating engine may be equipped with a first compressor and a second compressor. The first compressor is configured to pressurize the intake port and the second compressor is configured to de-pressurize the exhaust port. The first and second compressors may spin on a common shaft. The common shaft may also serve as the power shaft, in which event the power turbine powers both the first and second compressors directly.

Alternatively, a rotating shaft may join the first and second compressors in the manner of a conventional turbocharger and the shaft may not be connected directly to the power shaft. In this instance, the turbine engine assists in driving the first and second compressors by fluid coupling of the turbine compressor and the second compressor through the duct conveying reciprocating engine exhaust from the reciprocating engine to the turbine engine. The turbine compressor reduces the reciprocating engine back pressure at the exhaust port, effectively pulling reciprocating engine exhaust through the second compressor from the reciprocating engine exhaust port. The reduced back pressure causes the second compressor to spin, thereby causing the first compressor to spin and pressurizing the reciprocating engine intake port. The reduced back pressure also scavenges exhaust gas from the cylinder, allowing the cylinder to receive more fuel and fresh air.

The high temperature required for ignition and combustion of the reciprocating engine exhaust in the turbine is achieved by combustion of oxyhydrogen (HHO) generated through electrolysis of water. HHO is a stoichiometric mixture of hydrogen gas ($H_2$) and oxygen gas ($O_2$). The turbine engine drives an electrical generator configured to provide electrical power to an electrolytic HHO generator. The electrolytic HHO generator is described in U.S. non-provisional application Ser. No. 13/350,221, 'Electrolytic hydrogen generator and method,' filed Jan. 13, 2012, and incorporated by reference herein. The HHO generator produces oxyhydrogen by disassociating distilled water into hydrogen and oxygen using electricity from the electrical generator. The electrical generator also can power other electrical systems that otherwise would be powered by the reciprocating engine, freeing the reciprocating engine to perform other work. HHO can be mixed with the exhaust of the reciprocating engine upstream of the turbine and prior to compression in the turbine engine to obtain a more complete mixing and more complete incineration of the exhaust gases and particulate matter.

At engine start-up, the oxyhydrogen in the turbine engine is ignited using an electrical spark generated with energy from a battery and the reciprocating engine is started in the conventional way. Oxyhydrogen for the start of the turbine may be generated by electrolysis at the time of engine start or by use of stored oxyhydrogen. During periods when the reciprocating engine is not producing enough reciprocating engine exhaust to maintain operation of the turbine engine or when additional power is desired, a supplemental fuel, such as diesel fuel, may be supplied directly to the turbine engine.

The use of HHO in the turbine engine avoids the embrittlement of metals in the reciprocating engine because no hydrogen is added to the reciprocating engine and the turbine is constructed with metals that are resistant to embrittlement, such as titanium and stainless steel. The HBT can be retrofitted to an existing reciprocating engine with little adverse effect to the performance or reliability of the reciprocating engine.

As explained in the section on the "related art" above, internal combustion engines have an upper efficiency limit estimated by the Carnot cycle. For a system of two cascaded engines, the efficiency limit can be higher than that for either of the engines alone. There are two reasons: one, more mechanical power is derived by completing the combustion of the exhaust gases of the reciprocating engine, and two, the turbine engine low temperature is the high temperature of the reciprocating engine and the high temperature of the turbine engine is several times higher yet. The Carnot cycle entropy limit for the system of two serial engines is higher than that of either engine alone, as illustrated in the following paragraphs.

A simple mathematical analysis provides an understanding of the effect of cascading a reciprocating engine with a turbine engine on the entropic limit of the system. In the following discussion, the reciprocating engine is also referred to as the 'primary engine' and the turbine engine is also referred to as the 'secondary engine.' As obtained from the Carnot cycle an entropic efficiency upper limit for the reciprocating engine is obtained as follows:

$$\eta_1 = 1 - \frac{T_{L1}}{T_{H1}}$$

where $\eta_1$ is the efficiency of the reciprocating engine in converting the chemical energy in the fuel to mechanical work at the output of the reciprocating engine. The 'high temperature of operation' TH1 is the maximum temperature that the heated air achieves while it is expanding in the cylinder. The 'low temperature of operation' TL1 is the temperature of the air in the cylinder as the air is being compressed and before ignition. A remainder (R) can be defined as:

$$R = 1 - \eta_1$$

The remainder represents all the energy from the fuel of the reciprocating engine that has not been converted to mechanical work and is an upper limit of the remaining energy including lost heat and chemical energy remaining in the exhaust. Most important is the chemical energy remaining in the exhaust. Although the chemical energy of the exhaust is not known precisely it must be less than R, hence the increase in the overall entropy limit must be less than R times the efficiency ($\eta_2$) of the secondary (turbine) engine, $$\eta_2 = 1 - \frac{T_{L2}}{T_{H2}}$$

where $T_{L1}$ and $T_{H2}$ are the lower and high temperature limits of the secondary (turbine) engine.

Combustion of the exhaust of the reciprocating engine in a turbine engine allows extraction of the chemical energy remaining in the exhaust. We can assume that the entropic limit efficiency is the same as the entropic efficiency limit of the reciprocating engine. This assumption is reasonable in that turbine engines are capable of operating at much higher temperatures than reciprocating engines. Further, the Carnot derivation is also reasonable in that the turbine engine compresses an air-fuel mixture and then ignites it (albeit continuously) to provide a pressure increase to drive power turbines.

The efficiency for the system of two engines in combination becomes:

$$\eta_T = \eta_1 + R \times \eta_2$$

where $T_{L2}$ approximately equals $T_{H1}$ since the input to the turbine engine is the output of the reciprocating engine.

Example: for $T_H = 2T_L$
$\eta_1 = 0.5$
R=0.5
$\eta_2 = 0.5$
$\eta_T = 0.5 + (1 - 0.5)*0.5 = 0.75$ that is, the entropy limit of the complete HBT system is 50% higher (an increase in overall efficiency from 50% to 75%) than an engine without the booster technology. Further, since the extra work is obtained from the un-combusted emissions, the emissions of the HBT system are much lower than otherwise identical engines without the hydrogen booster turbine technology. The turbine engine also performs similarly to a catalytic converter by combusting the exhaust gases at very high temperatures.

In summary, a primary reciprocating engine is coupled to a secondary turbine engine such that the turbine engine increases the net power of the reciprocating engine by powering secondary functions (such as driving the turbocharger, generating electricity, reducing back pressure at the exhaust ports and operating a climate control system) and by combusting the exhaust gases using oxyhydrogen. The result is that the combined system, the inventors believe, can be 20% to 40% more efficient than a reciprocating engine alone while reducing emissions by over 90%.

Some examples of chemical reactions to be completed by high temperature incineration in the turbine engine combustion chamber are:

Carbon to carbon dioxide, $C + O_2 \rightarrow CO_2$, and carbon monoxide to carbon dioxide, 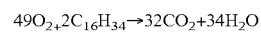

both of which are exothermic. Perfect diesel ($C_{16}H_{34}$) combustion would be $$49O_2 + 2C_{16}H_{34} \rightarrow 32CO_2 + 34H_2O$$

but all possible combinations from $C_{16}$ to C are possible. For example $CH_4$ can be a byproduct that forms part of an incomplete combustion and with the addition of oxygen can be reduced to $CO_2$ and $H_2O$, which is also an exothermic reaction.

The invention described herein provides for both an increase in efficiency and reduction of emissions by harnessing the energy in the exhaust gases via a turbine engine and using that energy to power peripheral secondary needs of a reciprocating engine, resulting in a net increase of the output power available from the reciprocating engine.

As noted above, the invention also applies to any exhaust or waste gas stream that includes chemical energy that can be released by combustion, such as exhaust or waste gas from an electrical generating station, refinery or chemical process. Examples include combustion of coal, oil, natural gas, wood, cooking oil, and any other fuel that is burned. A turbine engine can be fueled by the exhaust or waste gas stream and ignited with oxyhydrogen from an HHO generator. The HHO generator can be powered by an electrical generator driven by the turbine engine. Oxyhydrogen can be mixed with the exhaust or waste gas to promote combustion of the exhaust or waste gas in the combustion chamber of the turbine engine. The turbine engine can extract mechanical or electrical power from the chemical energy of the exhaust or waste gas stream. The mechanical or electrical power generated can increase overall system efficiency by supplying power that otherwise would be supplied by other sources. The high temperature combustion in the combustion chamber can reduce the amount of air contaminants in the exhaust or waste gas stream.

IV. BRIEF DESCRIPTION OF THE DRAWINGS

V. DESCRIPTION OF AN EMBODIMENT

Figure 1:
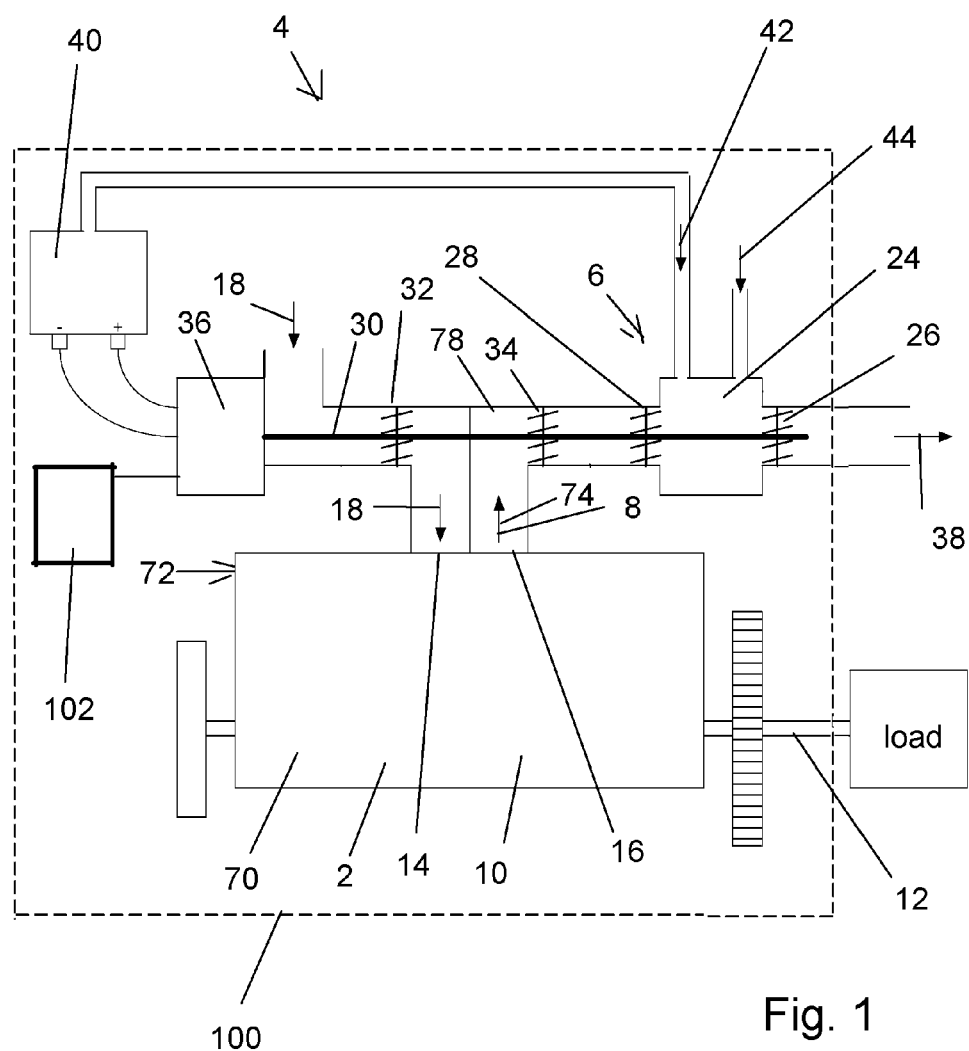
FIG. 1 is a schematic diagram of a reciprocating engine with Hydrogen Boosted Technology ('HBT').

FIG. 1 is a schematic diagram illustrating a reciprocating engine 2 with an hydrogen boosted technology ('HBT') system 4 attached. Although FIG. 1 illustrates a reciprocating engine 2 that is an internal combustion engine 10 that consumes a fuel 72 and that powers a motor vehicle 100, the HBT system 4 may be used with any chemical energy conversion apparatus 70, such as an electrical power generating station, an incinerator, a heating system, a refinery or chemical process, a turbine engine, a stationary reciprocating engine 2, or any other apparatus that combusts a fuel and produces a product of combustion.

Figure 2:
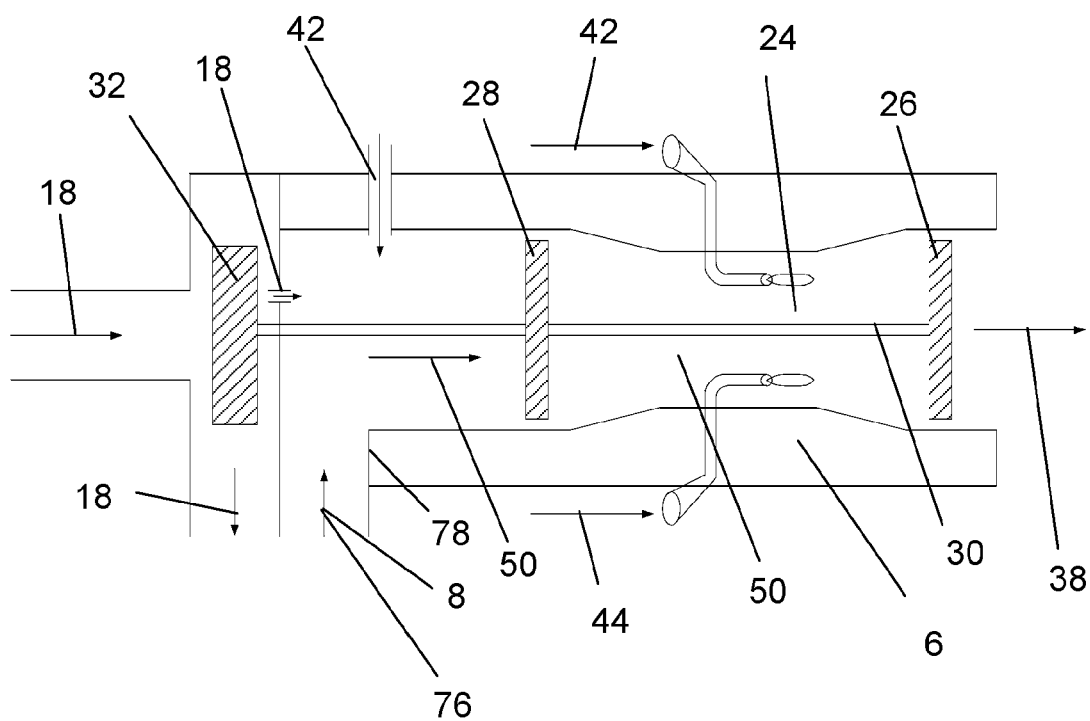
FIG. 2 is a schematic diagram of the turbine engine.

From FIG. 1, the reciprocating engine 2 can be an internal combustion engine 10 and either a compression ignition engine or a spark ignition engine. The reciprocating engine 2 is configured to drive a reciprocating engine drive shaft 12 to perform work, such as powering a motor vehicle 100, providing a stationary source of power, or for any other purpose. The reciprocating engine 2 has one or more intake ports 14 and one or more exhaust ports 16. Air 18 is brought in to fill the reciprocating engine cylinders with air-fuel mixture, or with air only for direct-injected engines. Combustion of the fuel 72 for the reciprocating engine 2 occurs in the reciprocating engine 2 and the exhaust 8 is expelled through the exhaust port 16. In contrast to conventional engines, the exhaust 8 is not expelled directly into the atmosphere or forced through a catalytic converter. Instead, the exhaust 8 is sucked from the exhaust ports 16 of the reciprocating engine 2 by a turbine engine 6, as shown by FIG. 2. The low pressure induced at the exhaust ports 16 of the reciprocating engine 2 by the suction from the turbine engine 6 increases the power output of the reciprocating engine 2, especially in comparison to those reciprocating engines 2 driving catalytic converters or afterburners.

The HBT system 4 includes a turbine engine 6, illustrated by FIGS. 1 and 2. The turbine engine fuel 76 consumed by the turbine engine 6 includes the products of combustion 74 of the chemical energy conversion apparatus 70, which in FIG. 1 is the exhaust 8 of the reciprocating engine 2. The combination of the reciprocating engine 2 and turbine engine 6 can produce a large boost in fuel efficiency and the elimination of most unwanted air contaminant emissions.

From FIGS. 1 and 2, the turbine engine 6 features a combustion chamber 24, a power turbine 26 and a turbine compressor 28. The turbine compressor 28 compresses the exhaust 8 from the reciprocating engine 2 and forces the compressed exhaust 8 into the combustion chamber 24. The compressed exhaust 8 burns at a very high temperature in the combustion chamber 24. The increase in temperature forces the working fluid, in this case air 18, to expand and increases the pressure of the air 18. The high-pressure air 18 forces its way past the blades of the power turbine 26, spinning the power turbine 26 at a very high rate of speed and exiting as turbine engine exhaust 38. The spinning power turbine 26 spins a power shaft 30 at a very high rate of speed. The spinning power shaft 30 spins the turbine compressor 28, and in the embodiment of FIG. 1, also spins a first compressor 32, a second compressor 34 and an electrical generator 36. The first compressor 32 pressurizes the air 18 at the intake ports 14 of the reciprocating engine 2 in the manner of the compressor of a conventional turbocharger. In the embodiment of FIG. 1, the turbine engine 6 also powers the second compressor 34, which serves to decrease the backpressure at the exhaust port 16 of the reciprocating engine 2. The power turbine 26, the turbine compressor 28, the first compressor 32 and the second compressor 34 may be compound; that is, the turbine and compressors may feature more than one set of blades, and may be either radial or axial. In the embodiment illustrated by FIG. 1, the turbine compressor 28 and the second compressor 34 define a compound compressor.

From FIG. 1, the turbine engine 6 also drives an electrical generator 36. The electrical generator 36 may produce electricity for the electrical system 102 of a motor vehicle 100 or other location of the reciprocating engine 2, hence eliminating that load from the reciprocating engine 2 and freeing the reciprocating engine 2 to perform other duties, such as moving the motor vehicle 100. The electrical generator 36 also provides electrical power to an electrolysis unit 40, also referred to herein as an 'HHO generator 40', to produce oxyhydrogen (HHO) 42 by the electrolysis of water. The HHO 42 is mixed with the reciprocating engine exhaust 8 for combustion in the combustion chamber 24 of the turbine engine 6. The HHO also produces a very hot flame for ignition of the reciprocating engine exhaust 8 at turbine engine 6 startup. The turbine engine 6 also may combust a supplemental fuel 44, such as diesel fuel, when the reciprocating engine exhaust 8 is insufficient to fuel the turbine engine 6 or when additional power is desired from the turbine engine 6.

FIG. 2 is schematic diagram of the turbine engine 6 and first compressor 32. As shown by FIGS. 1 and 2, the same compressors 28, 34 or series of compressors that sucks the exhaust 8 from the reciprocating engine 2 also compresses the exhaust 8 into the turbine engine 6. The exhaust 8 of the reciprocating engine 2 is delivered to the turbine engine 6 through a duct 78. In this document, the terms 'fans' and 'compressors' are used interchangeably to indicate an apparatus configured to move air 18 or exhaust 8 under power applied by a spinning power shaft 30.

Also from FIG. 2, oxyhydrogen 42 is added to the exhaust 8 of the reciprocating engine 2 to optimize the combustion of the exhaust 8 and produce the most power possible from the turbine engine 6 as well as minimizing its emissions. Oxyhydrogen 42 can be added prior to the compression of the reciprocating engine exhaust 8 in the turbine engine 6, as indicated by FIG. 2, to provide additional hydrogen in the exhaust-air mix. From FIG. 2, additional air 18 can be mixed with the reciprocating engine exhaust 8 from the pressurized and cooled side of the first compressor 32. The compressed fuel mixture 50 comprising reciprocating engine exhaust 8, ambient air 18 and oxyhydrogen gas 42 is ignited using an extremely hot oxyhydrogen 42 flame. Also from FIG. 2, the turbine engine may be partially fueled by a supplemental fuel 44, such as diesel fuel.

The inventors believe that a typical turbine engine operating speed of 10,000 rpm to 100,000 rpm will be acceptable The turbine engine 6 reduces emissions from the reciprocating engine 2. The combustion chamber 24 of the turbine engine 6 works like a catalytic converter or urea afterburner by completing the combustion of the reciprocating engine exhaust 8. The combustion chamber 24 of the turbine engine 6 operates at very high temperatures, in the vicinity of 1,800 degrees F. The extreme heat of the combustion of the fuel mixture 50 in the turbine engine 6 produces a complete burn of the reciprocating engine exhaust 8, leaving few unwanted emissions. The inventors believe that the addition of HHO 42 to the reciprocating engine exhaust 8 will reduce the emissions of NOx. The belief is based on claims that adding HHO 42 to the intake of engines 2 reduces NOx levels.

The primary improvements in reciprocating engine 2 efficiency stem from the fact that the heat generated from the combustion of the reciprocating engine exhaust 8 in the turbine engine 6 is harnessed to drive not only the reciprocating engine turbocharger (first compressor 32) but also a vacuum pump (second compressor 34 and turbine compressor 28) to extract the exhaust 8 from the reciprocating engine 2, eliminating back pressure at the reciprocating engine 2 exhaust ports 16. The turbine engine 6 also drives an electric generator 36, which may meet the requirements of a motor vehicle electrical system 102 or other electrical requirements that otherwise would be met by the reciprocating engine 2. These improvements in combination result in a large power increase to the reciprocating engine 2.

The turbine engine 6 and other components of the HBT system 4 are compact and will fit approximately where a passive turbocharger conventionally would be located on a prior art internal combustion engine 10.

The reciprocating engine 2 illustrated by FIG. 1 can be started in the conventional manner in that the presence of the turbine engine 6 does not inhibit the reciprocating engine 2 from starting and running. Upon startup, the reciprocating engine 2 produces exhaust gases 8 that spin the compressors 28, 34 and the power turbine 26 in the exhaust 8 of the reciprocating engine 2. The spinning compressors 28, 34 and power turbine 26 in turn spin the power shaft 30 that turns the electrical generator 36, powering the HHO generator 40 and generating oxyhydrogen 42. Once the reciprocating engine 2 is running and oxyhydrogen 42 becomes available, the turbine engine 6 is started with an electrical spark that ignites the oxyhydrogen 42. The power turbine 26 then provides the power to spin compressors 32, 34 and 28. Overall the HBT system 4 can be started providing there is enough stored electrical energy to do the job, as by a conventional storage battery.

Figure 3:
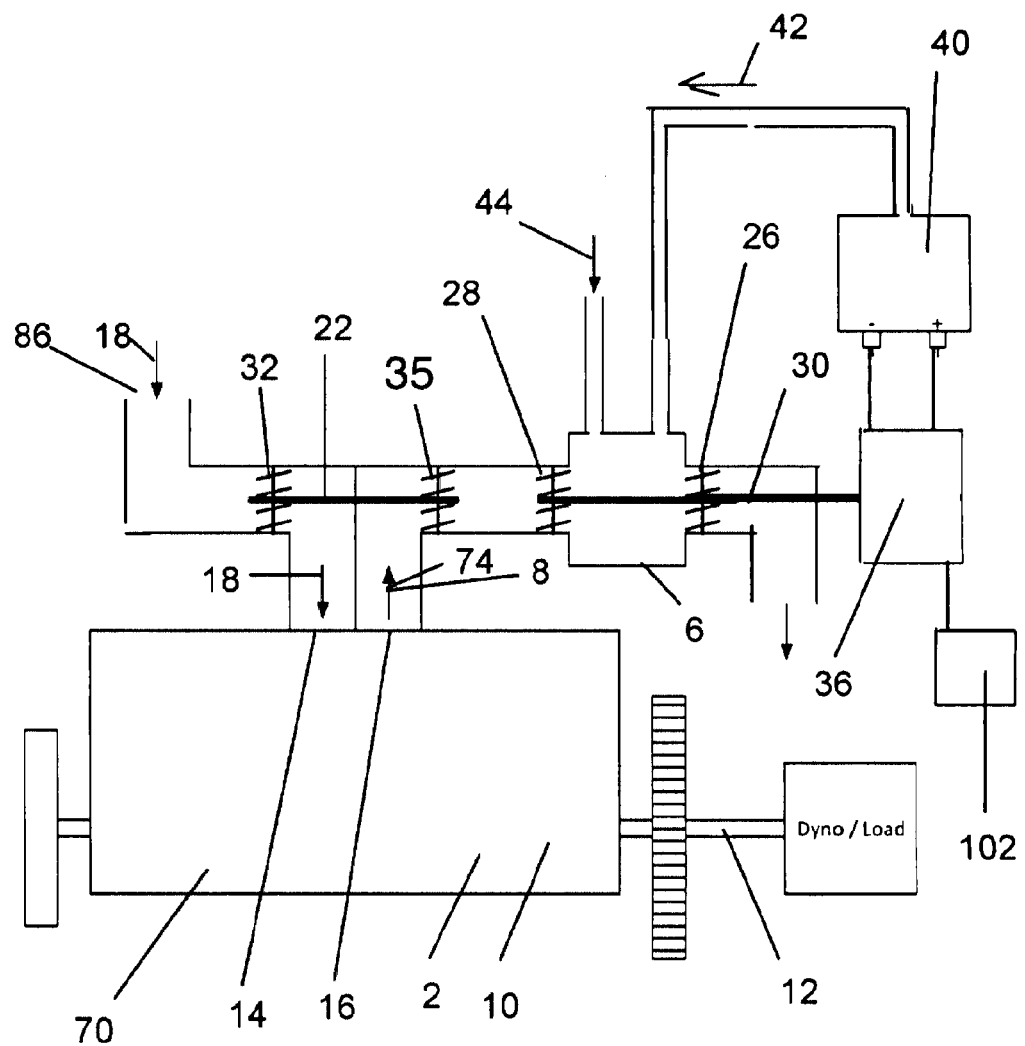
FIG. 3 is a schematic diagram of a second embodiment where the power shaft is not connected to the first compressor and turbocharger turbine.

FIG. 3 illustrates a second embodiment. The embodiment of FIG. 3 is similar to that of FIG. 1, except that the power shaft 30 does not provide a direct mechanical connection between the power turbine 26 and the first compressor 32. Instead, the first compressor 32 is connected to a turbocharger turbine 35 by a turbocharger power shaft 22 so that the first compressor 32, turbocharger turbine 35 and turbocharger power shaft 22 in combination operate in a manner similar to a conventional turbocharger. Exhaust moving past the turbocharger turbine 35 causes the turbocharger turbine 35 to spin, which spins the turbocharger power shaft 22 and the first compressor 32, compressing air 18 at the intake port 14 of the reciprocating engine 2. The embodiment of FIG. 3 differs from a conventional turbocharger in that the turbine compressor 28 reduces backpressure of the exhaust 8, effectively pulling exhaust 8 through the turbocharger turbine 35. The reduction in back pressure caused by the turbine compressor 28, and hence by the power turbine 26, effectively couples the power turbine 26 and the first compressor 28. In other respects, the embodiment of FIG. 3 operates in a manner similar to that of FIG. 1.

Figure 4:
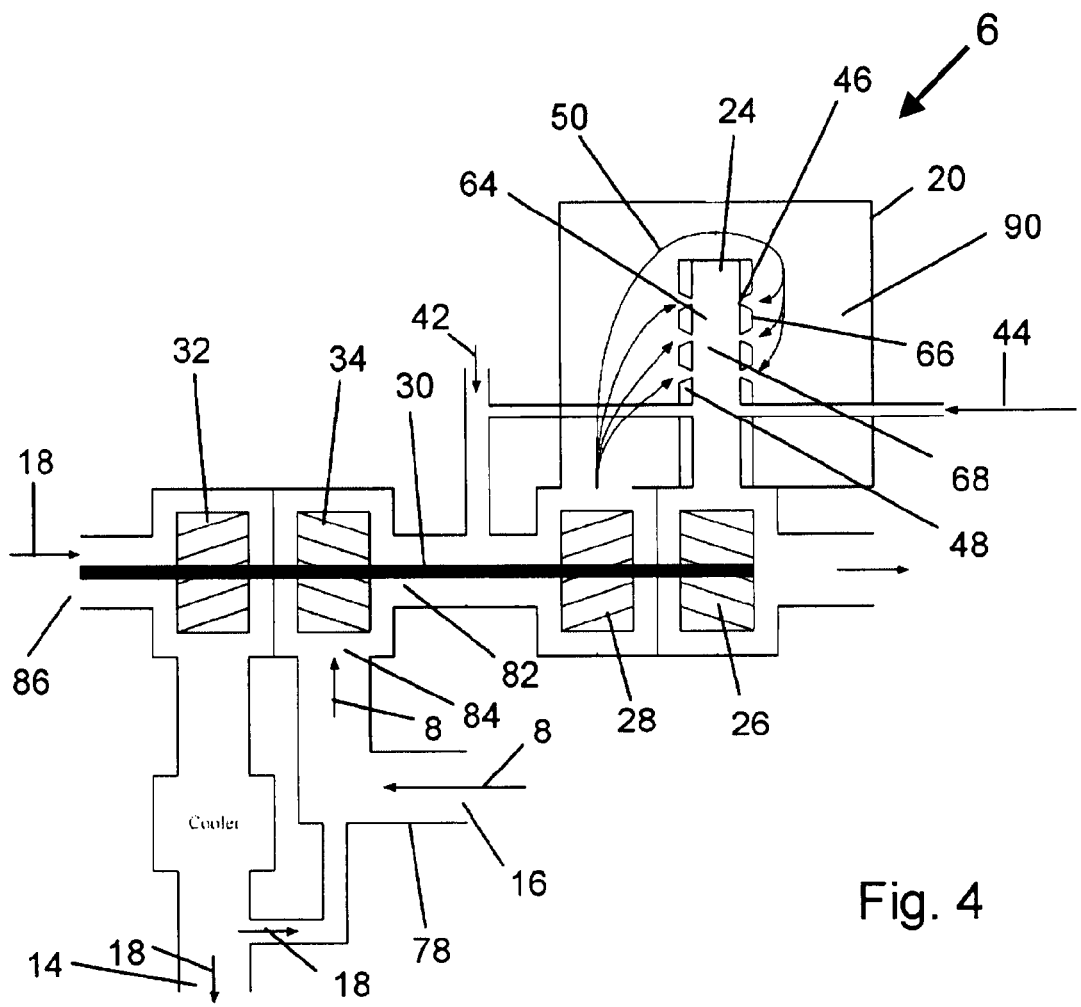
FIG. 4 is a schematic diagram of a third embodiment of the turbine engine and turbocharger.

FIG. 4 illustrates a third embodiment and is a refinement of the apparatus shown by FIGS. 1 and 2. In the embodiment of FIG. 4, the combustion chamber 24 is elongated and is contained within the interior volume 90 of a containment chamber 20. The containment chamber 20 is a pressure vessel. The combustion chamber 24 is oriented normal to the power shaft 30 and the power turbine 26 is a radial turbine. The combustion chamber 24 has a combustion chamber volume 68 defined by the combustion chamber interior 64. The combustion chamber 24 also has inlets 46 communicating through the combustion chamber wall 48 from the combustion chamber exterior 66 to the combustion chamber interior 64. The inlets 46 are distributed along the length of the combustion chamber 24 and about its periphery. The exhaust 8, air 18 and HHO 42, collectively referred to as the fuel mixture 50, flows around the exterior 66 of the combustion chamber 24 and within the interior volume 90 of the containment chamber 20, cooling the containment chamber 20 and the combustion chamber 24. The distributed inlets 46 allow the fuel mixture 50 to enter the combustion chamber 24 and to hold the flame of the combusting fuel mixture 50 away from the walls 48 of the combustion chamber 24, reducing thermal damage to the combustion chamber 24.

HHO 42 is mixed with the exhaust 8 from the reciprocating engine prior to entering the combustion chamber 24 and may be injected directly into the combustion chamber 24 to ignite the fuel mixture 50. Supplemental fuel 44 may be introduced into the combustion chamber when the exhaust 8 from the reciprocating engine 2 is not sufficient to fuel the turbine engine 6 or when additional power is desired.

As noted with respect to FIG. 3, the embodiment of FIG. 4 may be configured to not include a power shaft 30 that mechanically connects the power turbine 26 and the first compressor 32 and the second compressor 34. In that event, the second compressor 34 is a turbocharger turbine 35 as illustrated by FIG. 3 and the first compressor 32 and turbocharger turbine 35 are joined by a shaft 22, shown by FIG. 3, and are fluidly coupled to the power turbine 26 by the reduced backpressure induced by the turbine compressor 28 on the turbocharger turbine 35 and hence the exhaust port 16. The reduced backpressure pulls exhaust 8 past the turbocharger turbine 35, causing the turbocharger turbine 35 to spin and causing turbocharger turbine 35 to spin the shaft 22 thereby causing the first compressor 32 to spin.

Figure 5:
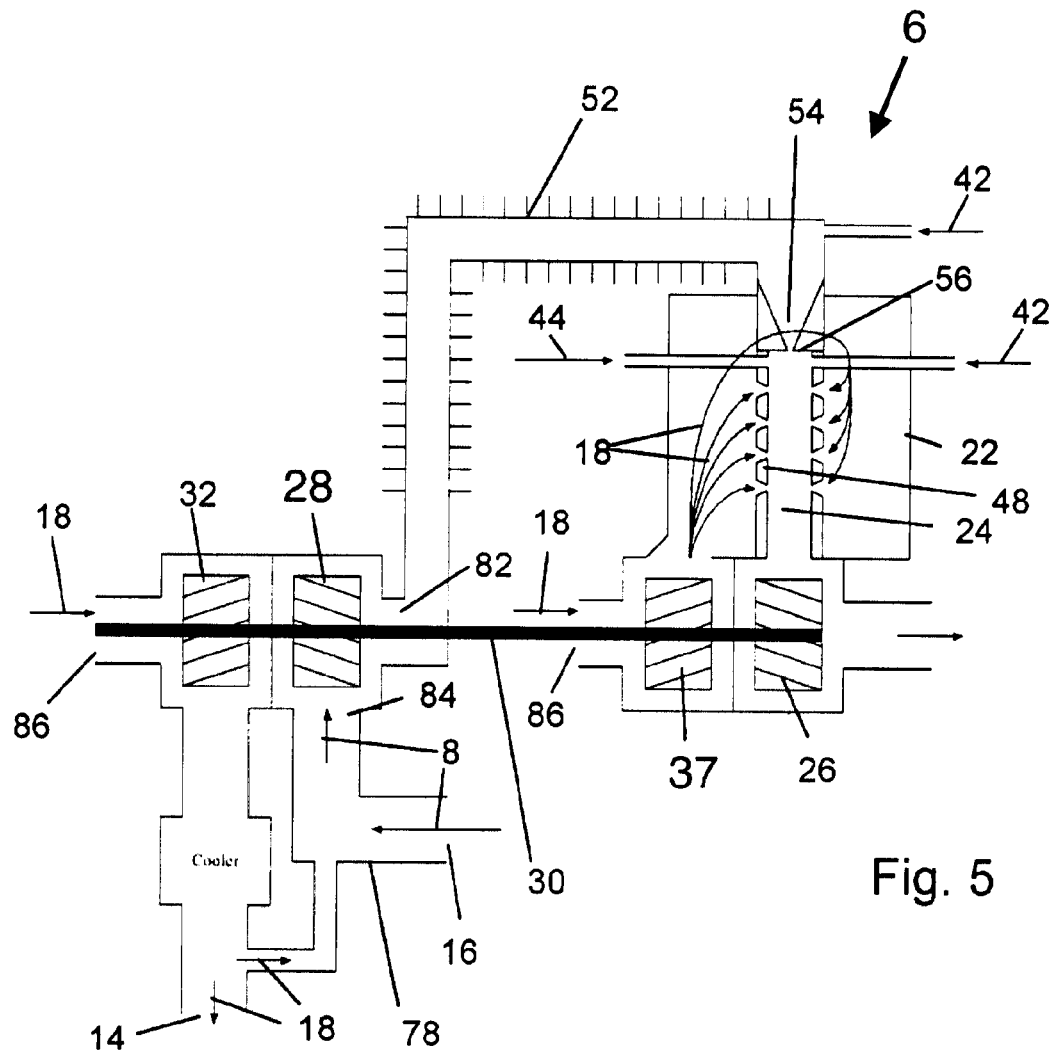
FIG. 5 is a schematic diagram illustrating a fourth embodiment of the turbine engine and reciprocating engine.

FIG. 5 illustrates a fourth embodiment. The fourth embodiment is similar to the embodiment of FIG. 4, but provides better cooling of the combustion chamber 24 and containment chamber 20. The reciprocating engine exhaust 8 is cooled by a heat exchanger 52 prior to injection into the combustion chamber 24, which allows a greater temperature increase in the combustion chamber 24 and hence more efficient operation of the turbine engine 6. Exhaust 8 is compressed by the turbine compressor 28, cooled in heat exchanger 52 and injected through a turbine intake nozzle 54 into a first end 56 of the combustion chamber 24. Fresh air 18 is compressed by the turbine ambient air compressor 37 and introduced to all sides of the combustion chamber 24 to cool the combustion chamber 24 and to force the flame away from the walls 48 of the interior 64 of the combustion chamber 24, all to reduce thermal damage to the combustion chamber wall 48. The flow of air 18 into the containment chamber 20 from the turbine ambient air compressor 37 may be tangent to the periphery of the interior volume 90 of the combustion chamber 24 and so induce a cyclonic flow within the interior volume 90 of the containment chamber 20 and about the exterior 66 of the combustion chamber 24. Also as illustrated by FIG. 5, cooling of the reciprocating engine exhaust 8, as by a heat exchanger 52, after compressing the exhaust 8 and before inserting the exhaust 8 into the turbine engine 6 increases the entropy efficiency limit and the output power of the turbine engine 6.

Figure 6:
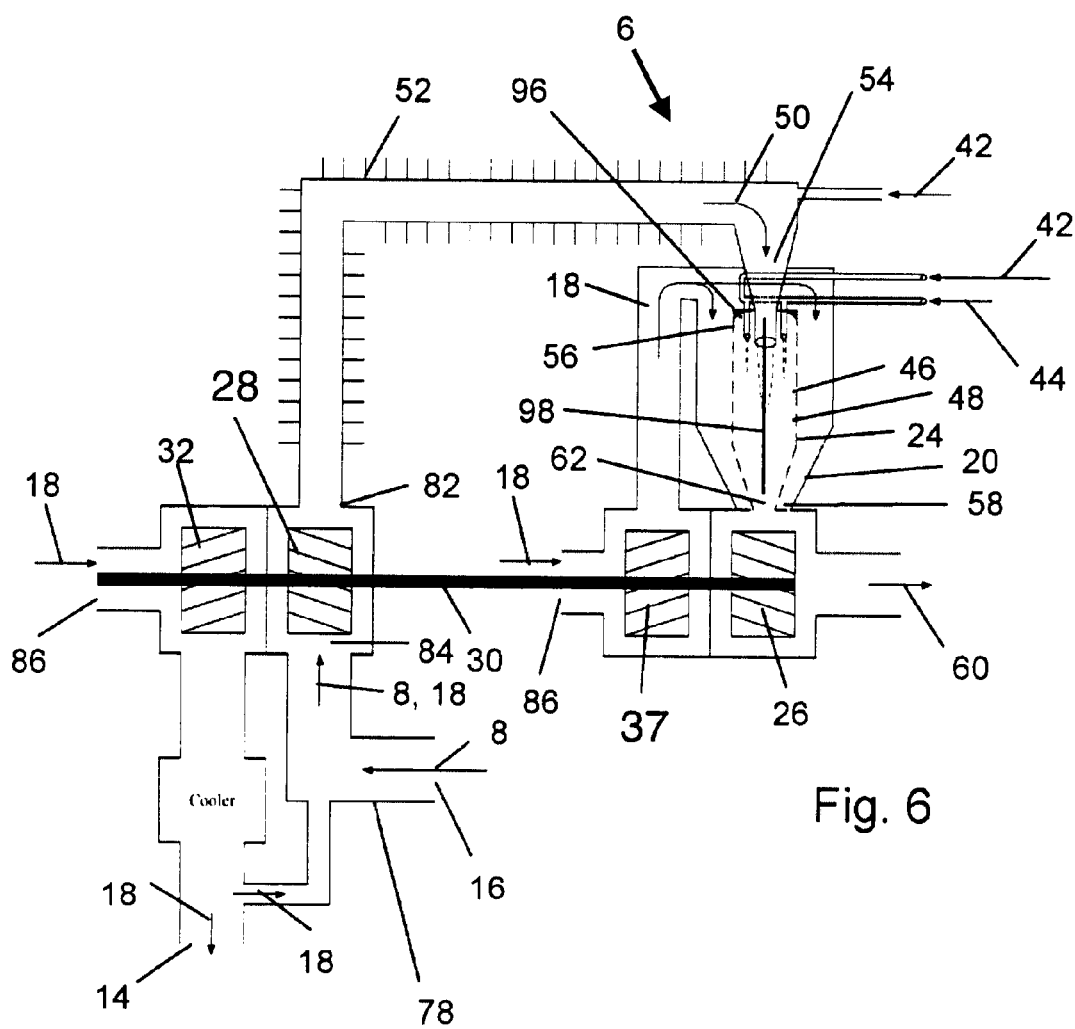
FIG. 6 is a fifth embodiment of the turbine engine and reciprocating engine.

FIG. 6 illustrates a turbine engine 6 and compressors 32, 37, 28 similar to that of FIG. 5, but with a modified turbine engine 6. The turbine engine 6 of FIG. 6 features a combustion chamber 24 that is elongated and has a first end 56 and a second end 58. The turbine engine 6 of FIG. 6 has a longitudinal axis 98 disposed between the first end 56 and second end 58. The fuel mixture 50, comprising a mixture of exhaust 8, air 18 and HHO 42, is injected into the first end 56 of the combustion chamber 24 and generally parallel to the longitudinal axis 98. HHO 42 also is injected into the combustion chamber 24 at the first end 56 through an HHO injector 96 and generally parallel to the longitudinal axis 98. If needed, a supplemental fuel 44 also may be injected at the first end 56 of the combustion chamber 24 and generally parallel to the longitudinal axis of the combustion chamber 24.

Also from FIG. 6, fresh air 18 is compressed by the turbine ambient air compressor 37 and enters the containment chamber 20 proximal to the first end 56 of the combustion chamber 24. The fresh air 18, also referred to as ambient air 18, flows around the exterior 66 of the combustion chamber 24 and within the containment chamber volume 90, cooling the combustion chamber 24. The fresh air 18 flows through the inlets 46 penetrating the combustion chamber walls 48, holding the flame within the combustion chamber 24 away from the walls 48 and reducing thermal damage to the combustion chamber walls 48. The flow of fresh air 18 within the containment chamber 20 may be a cyclonic flow.

Turbine engine exhaust 60 exits through a turbine exhaust nozzle 62, shown by FIG. 6, at a second end 58 of the combustion chamber 24 to increase the velocity of the turbine engine exhaust 60. Turbine engine exhaust 60 impinges upon the blades of power turbine 26, converting the kinetic energy of the high speed turbine exhaust 60 into rotational energy of the power shaft 30.

Figure 7:
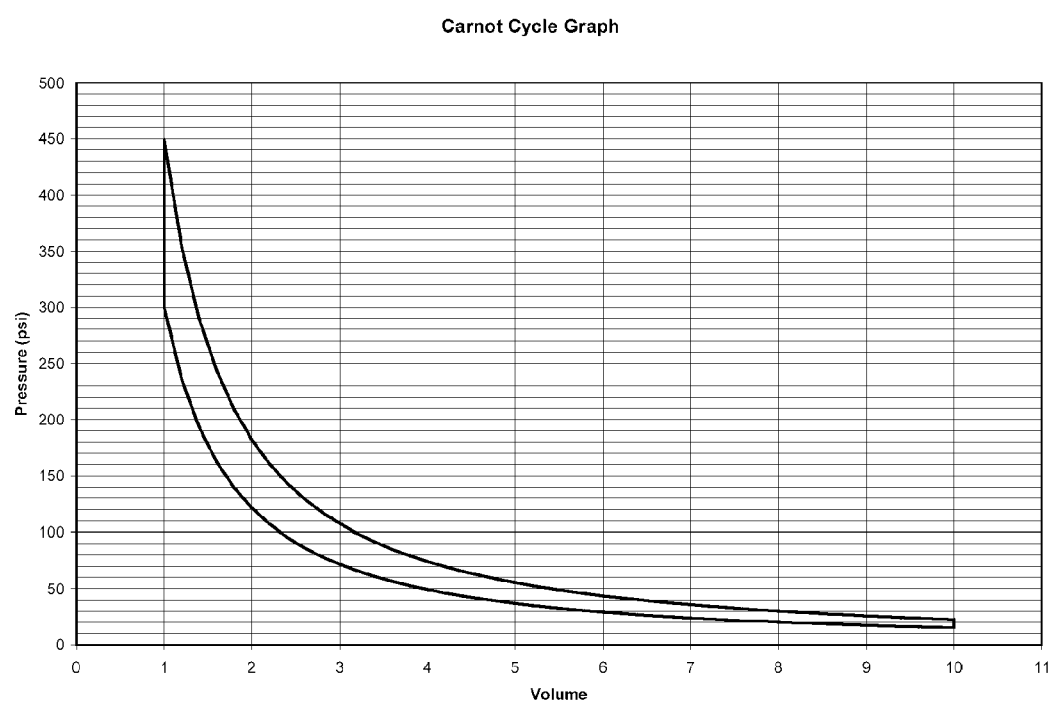
FIG. 7 is a pressure and volume (P-V) diagram for a Carnot cycle.
Figure 8:
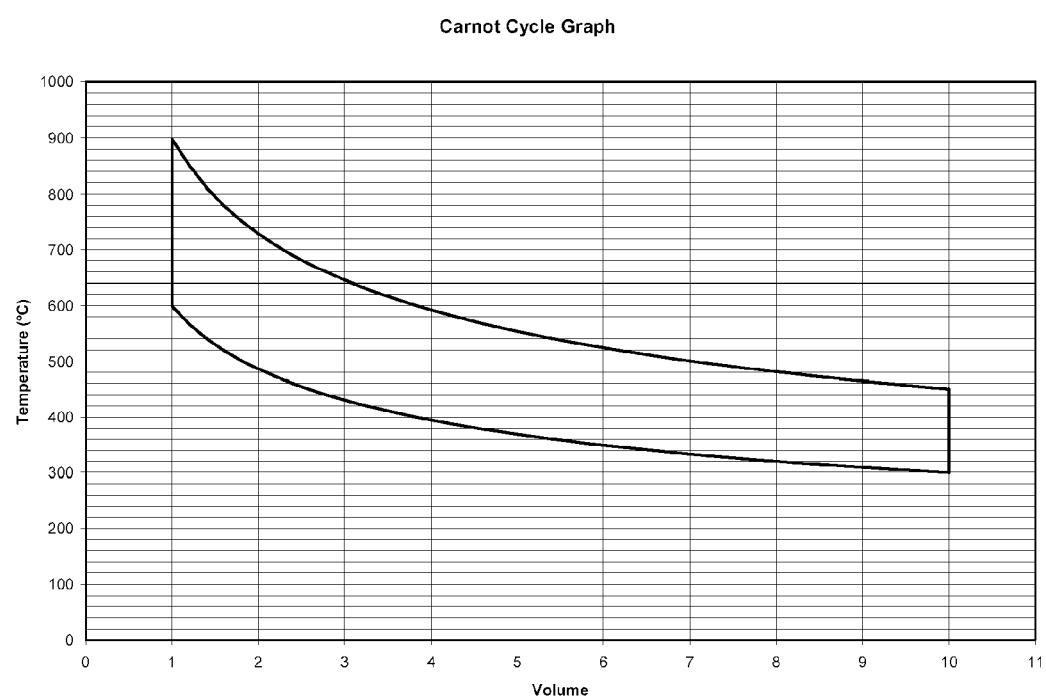
FIG. 8 is a temperature and volume diagram for a Carnot cycle.
Figure 9:
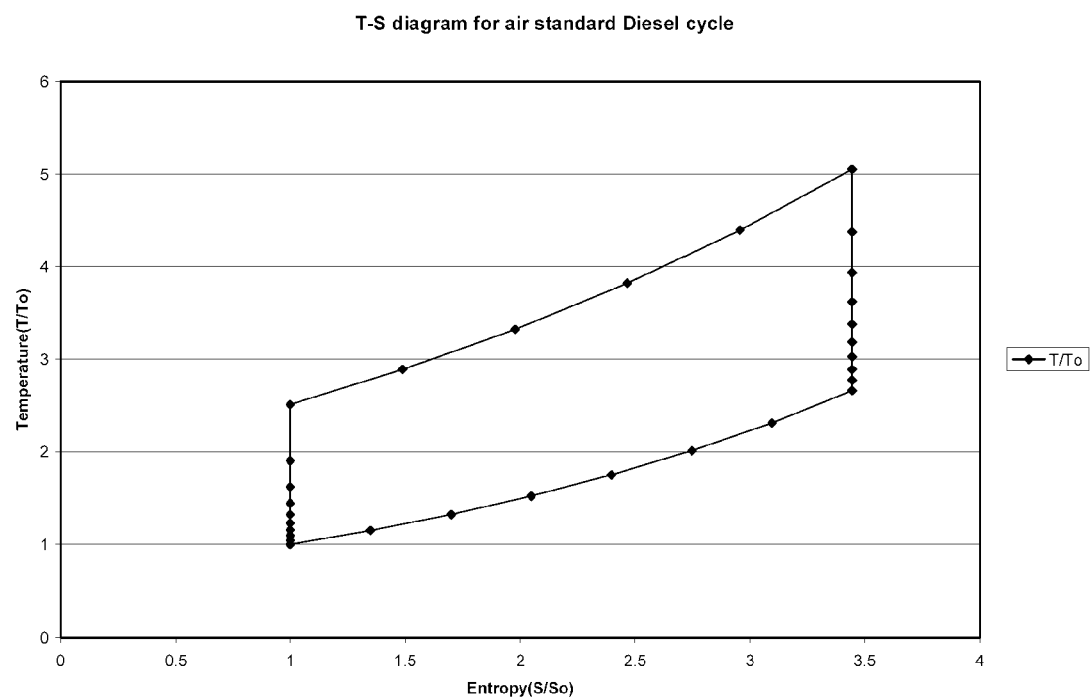
FIG. 9 is a T-S diagram for a diesel cycle.
Figure 10:
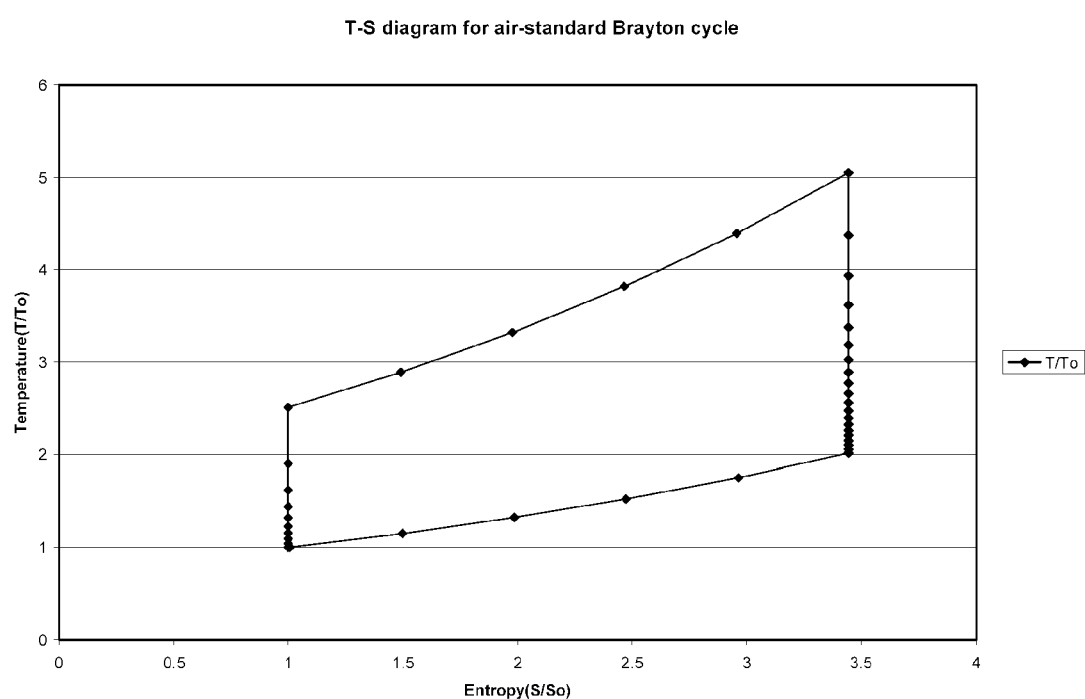
FIG. 10 is a T-S diagram for a Brayton (turbine engine) cycle.

FIGS. 7 through 10 illustrate the operation of the invention based on thermodynamic principals. The pressure-volume cycle of FIG. 7 is valid for either a reciprocating engine 2 or a turbine engine 6. In that the combustion will increase the pressure by a given amount, the compression prior to ignition produces much more work (i.e. increases the efficiency of the engine). Beginning at the maximum volume of 10, the piston stroke compresses the air according to $PV=nRT(V)/V$ where the temperature (see FIG. 4) of the gas increases according to $T(V)=T_0(V_0/V)^m$, where $T_0$ is the beginning temperature in degrees absolute and $V_0$ is the beginning volume. V is the variable volume, n is the number of moles of gas, R is the gas constant, and T is the variable temperature in absolute degrees, and $m=k-1=0.4$ is a fitted power constant appropriate for air. When the volume reaches 1 on FIG. 3, the mixture is ignited and the temperature rises according to how much heat is released by the combustion, further increasing the pressure in the cylinder or combustion chamber. The pressure pushes on the piston, transferring energy to the fly wheel. Because compressing air is a reversible process, the energy obtained from the fly wheel to compress the air is returned to the fly wheel. The additional energy obtained by heating the air in the cylinder is net output work or power delivered by the engine.

From FIG. 7, at the initial volume of 10 the temperature in the cylinder is at ambient. As the air is compressed the temperature rises according to $T(V)=T_0(V_0/V)^m$ where $m=k-1=0.4$ and where $T_0$ is ambient temperature in degrees absolute. When the volume reaches 1, the fuel is ignited and the temperature rises, peaks and decreases as the volume expands. When the volume reaches 10, the piston can no longer deliver any power and the exhaust gases are exhausted and the air in the cylinder brought back down to ambient pressure so the next cycle can begin. From an entropic point of view, the peak temperature of combustion can be considered the temperature of the high temperature reservoir and the ambient temperature can be considered the temperature of the low temperature reservoir. Note that in order for the temperature to remain stable, the temperature must be cycled back to its original value on every cycle.

The HBT system 4 may be used with any combustible fuel, such as diesel, gasoline, alcohol, ethanol or natural gas. The HBT system 4 may be used with any exhaust 8 or waste gas stream in which chemical energy remains in the exhaust or waste gas stream. An HBT-equipped reciprocating engine 2 works with or without a catalytic converter following the turbine engine 6; hence permitting installation of the HBT system 4 where the law may prohibit the removal of catalytic converters and other similar devices.

The inventors believe that more power (10% to 20%) and lower emissions (over 90%) are obtained by extracting the remaining energy from the exhaust 8 of a reciprocating engine 2 utilizing a small turbine engine 6 attached to the exhaust system and coupled to a turbocharger and an electric generator 36. Further, such a system of two cascaded engines (one primary reciprocating 2 and two a secondary turbine 6) has a higher entropic efficiency limit than either engine alone.

For a diesel engine, the ideal chemical reaction is to convert the diesel fuel into carbon dioxide ($CO_2$) and water ($H_2O$). At this time, due to improper fuel-air ratios and lack of appropriate elements (such as hydrogen), many chemical reactions of diesel engines remain incomplete resulting in exhaust emissions of carbon, carbon monoxide and all the possible permutations of broken diesel molecules. When fully reacted with oxygen and hydrogen, these molecules can release significant heat which can propel a turbine engine 6. Further, the completion of the reactions minimizes the release of those molecules to the atmosphere.

Figure 11:
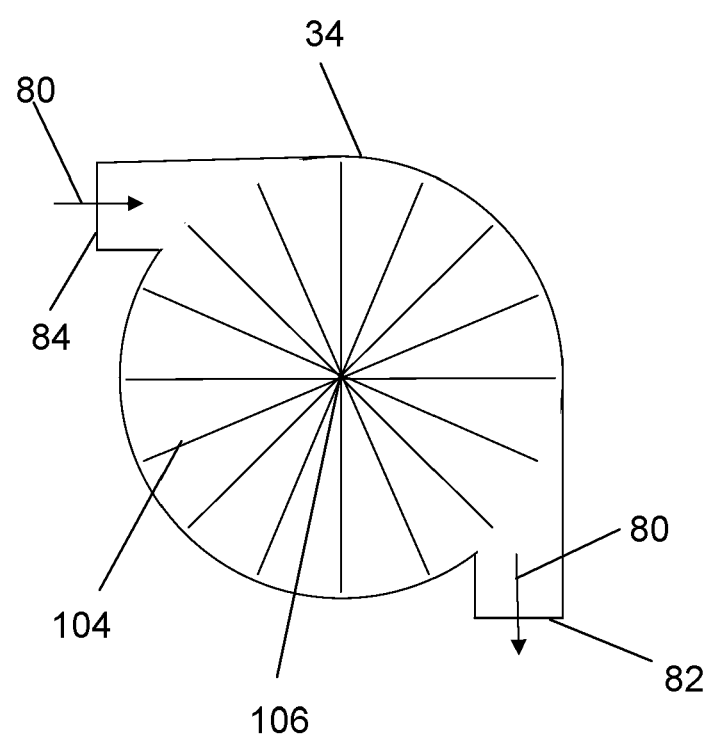
FIG. 11 is a schematic diagram of a combination compressor and turbine.

The second compressor 34, shown by FIGS. 1 and 3-6 and in the cross section of FIG. 11, serves two distinct roles. At the time that the reciprocating engine 2 is started, the turbine engine 6 is not yet running. The flow 80 of exhaust 8 from the reciprocating engine 2 turns the second compressor 34, causing second compressor 34 to act as a turbine. The second compressor 34 causes the power shaft 30 to spin, in the same manner as the turbine of a conventional turbocharger, which in turn causes the first compressor 32, turbine compressor 28, the power turbine 26, and the electrical generator 36 to spin. As the turbine engine 6 is started, expanding air 18 heated in the combustion chamber 24 acts on the power turbine 26, causing the power turbine 26 to spin and accelerating the rotation of the power shaft 30. The second compressor 34, now driven by the power turbine 26 through the power shaft 30, becomes a compressor and compresses the exhaust 8 from the reciprocating engine 2.

To accommodate both the turbine and compressor roles, the second compressor 34 may be configured as illustrated by FIG. 11, with both the inlet side 84 and outlet side 82 of the second compressor 34 proximal to the outside ends of the blades 104. This configuration differs from a conventional turbine, which has an outlet proximal to the axis of rotation of the blades 104, and from a conventional compressor, with the inlet proximal to the axis of rotation 106 of the blades 104.

LIST OF NUMBERED ELEMENTS reciprocating engine 2
Hydrogen boosted technology (HBT) 4
turbine engine 6
reciprocating engine exhaust 8
internal combustion engine 10
reciprocating engine drive shaft 12
intake port of the reciprocating engine 14
exhaust port of the reciprocating engine 16
combustion air for the reciprocating engine 18
containment chamber 20
shaft 22 connecting the first and second compressors
combustion chamber 24
power turbine 26
turbine compressor 28
power shaft 30
first compressor to pressurize the intake port 32
a second compressor to depressurize the exhaust port 34
electrical generator 36
turbine engine exhaust 38
HHO generator (electrolysis unit) 40
oxyhydrogen (HHO) 42
supplemental fuel 44 (of the turbine)
inlets 46 penetrating the combustion chamber wall
combustion chamber wall 48
fuel mixture 50 of the turbine engine
heat exchanger 52 for the reciprocating engine exhaust
turbine intake nozzle 54
first end of the combustion chamber 56
second end of the combustion chamber 58
turbine engine exhaust 60
turbine exhaust nozzle 62
combustion chamber interior 64
combustion chamber exterior 66
combustion chamber volume 68
chemical energy conversion apparatus 70
fuel for the chemical energy conversion apparatus 72
products of combustion 74
turbine engine fuel 76
electrolysis of water
duct 78
flow of the turbine engine exhaust 80
outlet side of the second compressor 82
inlet side of the second compressor 84
ambient air intake 86
containment chamber volume 90
HHO injector 96
longitudinal axis of the combustion chamber 98
motor vehicle 100
electrical system of a motor vehicle 102
second compressor blades 104
axis of rotation 106 of the second compressor blades
Turbocharger turbine 35
Turbine ambient air compressor 37

We claim:
1. An apparatus for producing electrical or mechanical power, the apparatus comprising:
   a. a chemical energy conversion apparatus, said chemical energy conversion apparatus being configured to combust a fuel and to generate a product of combustion of said fuel;
   b. a turbine engine having a turbine compressor, a combustion chamber and a power turbine, said turbine compressor and said chemical energy conversion apparatus having a configuration such that said product of combustion from said energy conversion apparatus is sucked by said turbine compressor from said energy conversion apparatus and compressed for combustion in said combustion chamber when said chemical energy conversion apparatus and said turbine engine are in operation, said combustion chamber being configured to combust a turbine engine fuel, said turbine engine fuel comprising said product of combustion, said combustion chamber being in fluid communication with said power turbine, said power turbine being configured for rotation in response to combustion of said turbine engine fuel in said combustion chamber, said power turbine being configured to power said turbine compressor.

2. The apparatus of claim 1 wherein said configuration such that said product of combustion from said energy conversion apparatus is sucked by said turbine compressor from said energy conversion apparatus comprises: a duct communicating between said chemical energy conversion apparatus and said turbine compressor, said duct being configured to convey said product of combustion from said chemical energy conversion apparatus to said turbine compressor.

3. The apparatus of claim 2 wherein said chemical energy conversion apparatus is a reciprocating engine, said reciprocating engine being an internal combustion engine having an exhaust port, said product of combustion being a reciprocating engine exhaust, said configuration such that said product of combustion from said energy conversion apparatus is sucked by said turbine compressor from said energy conversion apparatus further comprises: said turbine compressor being configured to reduce a pressure of said reciprocating engine exhaust at said exhaust port whereby said reciprocating engine produces said reciprocating engine exhaust and said turbine engine combusts said reciprocating engine exhaust.

4. The apparatus of claim 3 wherein said turbine engine fuel further comprising HHO.

5. The apparatus of claim 4, the apparatus further comprising: an HHO generator, said HHO generator being configured to produce said HHO by an electrolysis of water.

6. The apparatus of claim 5, the apparatus further comprising: an electrical generator, said electrical generator being configured to provide electrical power to said HHO generator, said electrical generator being configured to be driven by a one of said reciprocating engine and said turbine engine.

7. The apparatus of claim 3 wherein said reciprocating engine has an intake port, said intake port being configured to supply an air to said reciprocating engine, the apparatus further comprising: a first compressor in fluid communication with said intake port, said first compressor being configured to pressurize said intake port.

8. The apparatus of claim 7 wherein said turbine engine further comprises:
a power shaft, said power shaft being configured for rotation and to be driven by said power turbine, said power shaft being configured to drive said first compressor, whereby said turbine engine powers said first compressor to turbocharge said reciprocating engine.

9. The apparatus of claim 7 wherein said first compressor is configured to pressurize air, said first compressor being configured to inject said pressurized air into said reciprocating engine exhaust prior to said turbine engine, whereby said first compressor provides combustion air for said reciprocating engine and said turbine engine when said reciprocating engine and said turbine engine are operating.

10. The apparatus of claim 3 wherein said exhaust port is configured to convey said reciprocating engine exhaust from said reciprocating engine, the apparatus further comprising: a second compressor, said second compressor having an inlet side, said inlet side being in fluid communication with said exhaust port, said second compressor having an outlet side, said outlet side of said second compressor being in fluid communication with said turbine engine, whereby said second compressor is configured to depressurize said exhaust port.

11. The apparatus of claim 10 wherein said turbine engine further comprises:
a. a power shaft, said power shaft being configured for rotation and to be driven by said power turbine, said power shaft being configured to drive said second compressor, whereby said power turbine powers said second compressor to depressurize said exhaust port of said reciprocating engine.

12. The apparatus of claim 3, the apparatus further comprising: an ambient air intake, said ambient air intake being in communication with said turbine compressor, whereby an ambient air is mixed with said reciprocating engine exhaust prior to entering said turbine engine when said reciprocating engine and said turbine engine are operating and whereby said turbine compressor compresses both said reciprocating engine exhaust and said ambient air for combustion in said combustion chamber.

13. The apparatus of claim 3 wherein said turbine compressor further comprises:
a turbine ambient air compressor, said turbine ambient air compressor being configured to compress an ambient air and to force said ambient air into said combustion chamber, whereby said ambient air is mixed with said reciprocating engine exhaust when said reciprocating engine and said turbine engine are operating.

14. The apparatus of claim 3 wherein said reciprocating engine has an intake port, said intake port being configured to supply an air to said reciprocating engine, said exhaust port being configured to convey said reciprocating engine exhaust from said reciprocating engine, the apparatus further comprising:
a. a first compressor in fluid communication with said intake port, said first compressor being configured to pressurize said intake port;
b. a turbocharger turbine having an inlet side in fluid communication with said exhaust port and an outlet side in fluid communication with said turbine compressor;
c. a turbocharger power shaft, said turbocharger power shaft being configured for rotation and being configured to transmit power from said turbocharger turbine to said first compressor, whereby said turbine compressor sucks reciprocating engine exhaust through said turbocharger turbine, causing said turbocharger turbine to rotate, in turn causing said first compressor to rotate.

15. The apparatus of claim 3 wherein said turbine engine further comprises:
a. a containment chamber defining a containment chamber volume;
b. said combustion chamber disposed within said containment chamber volume, said combustion chamber defining a combustion chamber interior and a combustion chamber exterior, said combustion chamber defining a plurality of inlets communicating between said combustion chamber exterior and interior, said combustion chamber having a configuration so that combustion of said turbine engine fuel occurs within said combustion chamber;
c. said turbine compressor being configured to compress said reciprocating engine exhaust and to inject said reciprocating engine exhaust into said containment chamber volume outside of said combustion chamber interior so that said reciprocating engine exhaust travels through said inlets to reach said combustion chamber interior, whereby said reciprocating engine exhaust cools said combustion chamber exterior prior to combusting in said combustion chamber interior when said reciprocating engine and said turbine engine are operating.

16. The apparatus of claim 15 wherein said turbine engine is configured so that said reciprocating engine exhaust enters said containment chamber tangent to a periphery of said volume of said containment chamber when said turbine engine is operating, whereby said reciprocating engine exhaust moves in a cyclonic flow within said containment chamber volume prior to entering said inlets when said reciprocating engine and said turbine engine are operating.

17. The apparatus of claim 15 wherein said configuration of said combustion chamber so that combustion of said turbine engine fuel occurs within said combustion chamber comprises: an HHO injector disposed within said combustion chamber interior, said HHO injector being configured to inject HHO into said combustion chamber interior when said turbine engine is operating.

18. The apparatus of claim 3 wherein said turbine engine comprises:
a. a containment chamber defining a containment chamber volume;
b. said combustion chamber is disposed within said containment chamber volume, said combustion chamber defining a combustion chamber interior and a combustion chamber exterior, said combustion chamber defining inlets communicating between said combustion chamber exterior and interior, said combustion chamber having a configuration so that combustion of said turbine engine fuel occurs within said combustion chamber when said turbine engine is operating;

c. a turbine ambient air compressor configured to compress an ambient air and to inject said ambient air into said containment chamber volume outside of said combustion chamber interior so that said ambient air travels through said inlets to reach said combustion chamber interior when said turbine engine is operating, whereby said ambient air cools said combustion chamber exterior prior to combusting in said combustion chamber interior.

19. The apparatus of claim 18 wherein said turbine engine is configured so that said ambient air enters said containment chamber tangent to a periphery of said interior volume when said turbine engine is operating, whereby said air moves in a cyclonic flow within said containment chamber prior to entering said inlets when said turbine engine is operating.

20. The apparatus of claim 18 wherein said configuration of said combustion chamber so that combustion of said turbine fuel occurs within said combustion chamber comprises: an HHO injector disposed within said combustion chamber interior, said HHO injector being configured for injection of HHO into said combustion chamber.

21. The apparatus of claim 20 wherein said combustion chamber has a first end, a second end and a longitudinal axis between said first and said second ends, said combustion chamber defining a reciprocating engine exhaust nozzle, said reciprocating engine exhaust nozzle being configured to direct said reciprocating engine exhaust into said combustion chamber proximal to said first end and parallel to said longitudinal axis, said power turbine being located proximal to said second end of said combustion chamber, said combustion chamber being configured to direct a turbine engine exhaust toward said power turbine, whereby said reciprocating engine exhaust enters said first end of said combustion chamber, is combusted, and is directed to said power turbine proximal to said second end of said combustion chamber when said turbine engine is operating.

22. The apparatus of claim 21 wherein said HHO injector is aligned with said longitudinal axis and proximal to said first end, whereby said HHO may be injected into said combustion chamber proximal to said first end and parallel to said longitudinal axis when said turbine engine is operating.

23. The apparatus of claim 18, the apparatus further comprising:
a turbine exhaust nozzle defined by a one of said containment chamber and said combustion chamber, said turbine exhaust nozzle being configured to direct said turbine exhaust to said power turbine when said turbine engine is operating, whereby said turbine exhaust nozzle increases a velocity of said turbine exhaust impinging upon said power turbine.

24. The apparatus of claim 3, the apparatus further comprising: a heat exchanger, said heat exchanger configured to cool said reciprocating engine exhaust prior to combustion of said reciprocating engine exhaust by said turbine engine.

25. The apparatus of claim 3, the apparatus further comprising: an electrical generator, said electrical generator being powered by said turbine engine, said electrical generator being configured to supply electrical power to said reciprocating engine.

26. The apparatus of claim 25 wherein said reciprocating engine and said turbine engine are operably connected to a motor vehicle, said electrical generator being configured to supply said electrical power to an electrical system of said motor vehicle, whereby said turbine engine relieves said reciprocating engine of generating electrical power to operate said electrical system of said motor vehicle.

27. The apparatus of claim 3, said turbine engine fuel further comprising: a supplemental fuel.

28. The apparatus of claim 27, said supplemental fuel comprising diesel fuel.

* * * * *